Aug. 27, 1963  L. E. KUNTZ  3,101,613
TEMPERATURE CORRECTED VOLUME MEASUREMENT
Filed March 3, 1961  3 Sheets-Sheet 1

*INVENTOR.*
L.E. KUNTZ

BY

*ATTORNEYS*

INVENTOR.
L.E. KUNTZ

Aug. 27, 1963

L. E. KUNTZ 3,101,613

TEMPERATURE CORRECTED VOLUME MEASUREMENT

Filed March 3, 1961

INVENTOR.
L. E. KUNTZ

BY *Hudson & Young*

ATTORNEYS

United States Patent Office 3,101,613
Patented Aug. 27, 1963

3,101,613
TEMPERATURE CORRECTED VOLUME MEASUREMENT
Louis E. Kuntz, Bartlesville, Okla., assignor to Phillips Petroleum Company, a corporation of Delaware
Filed Mar. 3, 1961, Ser. No. 93,268
14 Claims. (Cl. 73—223)

This invention relates to automatically recording a temperature corrected volume. In one aspect the invention relates to lease automatic custody transfer and to a method and apparatus for automatically recording a temperature corrected volume representative of the liquid transferred. In another aspect the invention relates to a temperature responsive cam actuated temperature correction factor readout system.

This application is a continuation-in-part of my application Serial No. 74,731, filed December 8, 1960, now abandoned.

In the petroleum industry it is customary to gather oil from producing wells at a central lease location and to transfer custody of the oil to a pipeline for further distribution. Accounting for the oil transferred normally is done on a basis of volume corrected to a reference temperature, often 60° F. It has been common practice to measure the volume, as by gauging storage tanks, prior to transfer to the pipeline, and to record the temperature of the transferred oil so that a correction factor can later be applied. Where lease automatic custody transfer systems have been used, automatic temperature recording means have been provided to permit temperature corrections to be applied manually to the automatically recorded volume measurements.

It is an object of this invention to provide automatically recorded temperature corrected volume measurements.

It is another object of this invention to provide improved lease automatic cuostody transfer including automatic recording of temperature corrected volume figures. Another object of this invention is to provide a temperature responsive cam actuated temperature correction factor readout instrument.

Other aspects, objects and the several advantages of this invention will be apparent from a study of this disclosure, the drawing, and the appended claims.

According to my invention, there is provided a method for metering liquid by transferring a fixed volume of the liquid, recording a nominal value of the volume transferred, measuring the temperature of the transferred liquid and automatically recording responsive to this temperature a number of electrical pulses representing the difference between the nominal value and the amount of the transferred volume corrected to a reference temperature. The fixed volume can be determined by accumulating the liquid in a meter tank, or by transfer through some other type of positive displacement metering means such as, for example, a rotary positive displacement meter.

Also according to my invention, there is provided a method for metering liquid by transferring the liquid through a positive displacement meter, producing electrical signals representing the rate of flow and temperature of the liquid, combining these signals to produce a signal representing the rate of flow corrected to the reference temperature, and converting this latter signal to electrical pulses at a rate representing the temperature corrected rate of flow.

Further according to my invention, there is provided liquid metering apparatus which comprises positive displacement volume metering means, means for transferring a fixed volume of liquid through this means, means to record a value representing a nominal value of the volume transferred, means for measuring the temperature of the transferred liquid, and automatic means for recording, responsive to the temperature, a number of electrical pulses representing a temperature correction volume.

Further according to my invention, there is provided a temperature correction factor readout unit which comprises a cam which actuates a cam follower, the follower being positioned relative to the cam by automatic means responsive to the temperature of the liquid being metered. This unit is suitable for use in the automatic means for recording a temperature correction volume.

Further according to my invention, there is provided liquid metering apparatus comprising positive displacement volume metering means, means for producing electrical signals representing the rate of flow and temperature of the liquid, means to combine these signals and produce a signal representing the rate of flow of the liquid corrected to a reference temperature, and means to convert this latter signal to electrical pulses at a rate representing the temperature corrected rate of flow.

Figure 1:
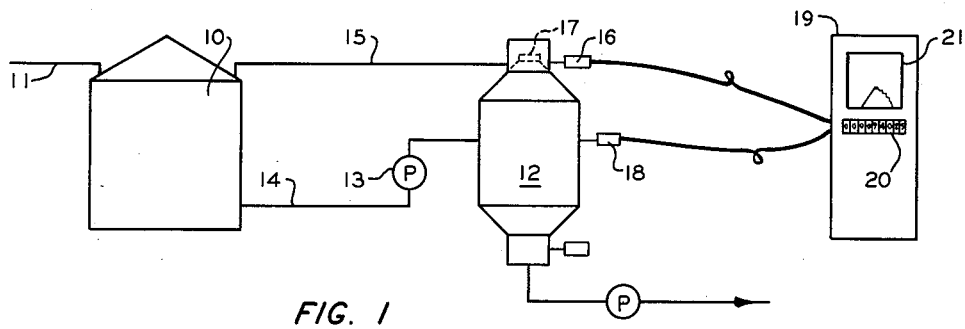
FIGURE 1 is a simplified schematic diagram of a lease automatic custody transfer system including means according to the present invention for recording a temperature corrected volume.

Referring to FIGURE 1, fluid production from petroleum wells (not shown) enters a surge tank 10 through a flow line 11. Liquid produced into surge tank 10 is periodically transferred to meter tank 12 by pump 13 in transfer conduit 14. Overflow line 15 connects the upper portion of meter tank 12 with surge tank 10. A liquid level detector 16 is provided below the level of overflow weir 17 in the upper portion of meter tank 12 while temperature responsive means 18 are connected to a mid-point of this tank. Both level detecting means 16 and temperature responsive means 18 are connected with temperature corrected volume recording unit 19 which unit comprises a volume readout indicator 20 and, if desired, may also be provided with a temperature recorder 21.

Figure 2:
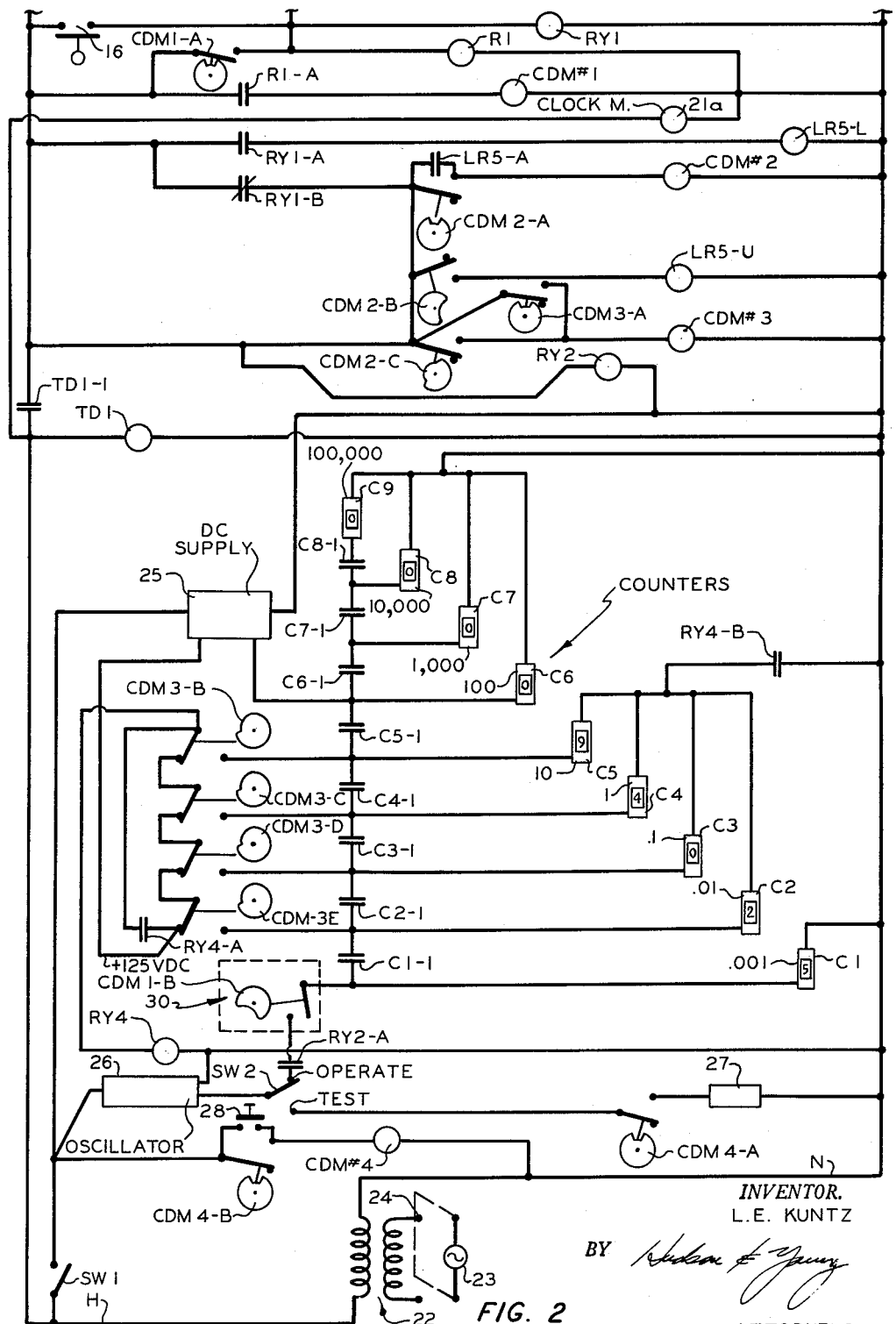
FIGURE 2 is a schematic circuit diagram of automatic temperature corrected volume recording means suitable for use in combination with other elements of a lease automatic custody transfer system.

In FIGURE 2, a transformer 22 is connected across an alternating current power source 23 through a master switch 24. The secondary of this transformer provides power to the temperature corrected volume readout system illustrated, through conductors H and N. A time delay relay TD1 is connected between conductors H and N and this relay actuates contacts TD1-1 to control the power supply to relays R1, RY1, RY2 and LR5, which includes a latching coil LR5-L and unlatching LR5-U, and cam drive motors CDM1, CDM2 and CDM3, if necessary. Clock motor 21a, D.C. supply 25, constant frequency oscillator 26, relay RY4 and cam drive motor CDM4 are all connected as shown between lines H and N ahead of contacts TD1-1. Temperature compensation gating switch 30 also is included in this portion of the circuit. A manual switch SW1 can be provided as shown to isolate this portion of the circuit if desired.

If desired, a test circuit comprising a contact of switch SW2, a cam switch CDM-A, test counter 27 and push button 28 may be provided.

Relay RY1 actuates contacts RY1-A and RY1-B. Relay R1 operates contacts R1-A. Cam drive motor CDM1 operates cam switches CDM1-A and CDM1-B, the latter being included in temperature compensation gating switch 30 and described in more detail below. Latching relay LR5 operates contacts LR5-A. Cam drive motor CDM2 operates cam swtiches CDM2-A, CDM2-B and CDM2-C. Relay RY2 operates contacts RY2-A. Cam drive motor CDM3 operates cam switches CDM3-A, CDM3-B, CDM3-C, CDM3-D and CDM3-E, the latter four forming cam actuated pulsing means to transmit a predetermined signal to the recording counters. Relay RY4 operates contacts RY4-A and RY4-B while cam drive motor CDM4 operates cam switches CDM4-A and CDM4-B.

A group of single decade counters, C1, C2, C3, C4, C5, C6, C7, C8 and C9 are connected as shown and the first eight of these are provided with contacts C1-1, C2-1, C3-1, C4-1, C5-1, C6-1, C7-1 and C8-1, respectively, to actuate the next higher counter upon one complete revolution, thus tying these single decade counters together to form a plural decade unit.

Figure 3:
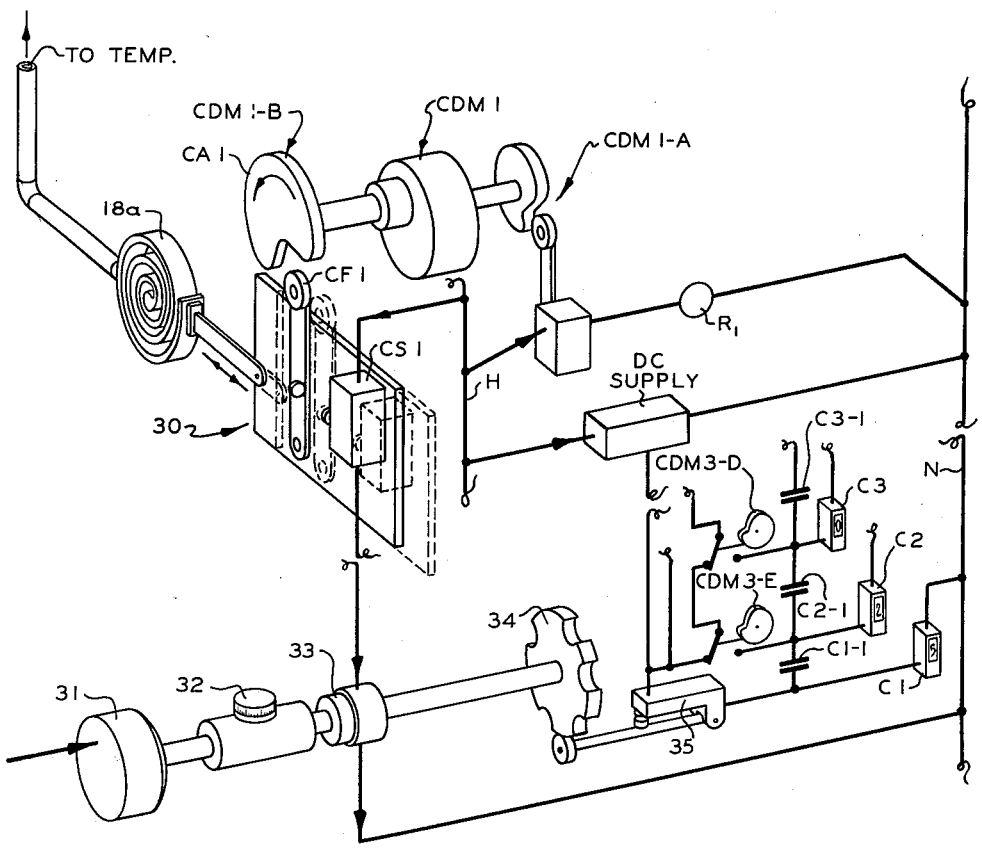
FIGURE 3 is a schematic diagram of a temperature correction factor transmitting apparatus.

In FIGURE 3 are shown details of gating switch 30 as well as one form of electrical pulse generator suitable for use in transmitting the pulses to record a temperature correction volume. Gating switch 30 includes cam drive motor CDM1 which actuates cam switches CDM1-A and CDM1-B. CDM1-A connects the coil of relay R1 between conductors H and N to actuate this relay. The cam follower CF1 is actuated by cam CA1 to operate switch CS1 which is the gating switch of the instrument. The plate to which cam follower CF1 and switch CS1 are attached is connected to temperature responsive means which adjust the position of this unit relative to cam CA1 to vary the gating period. In the embodiment illustrated, the temperature responsive means comprises a temperature sensing element in meter tank 12 which generates a pressure proportional to the temperature. The pressure is transmitted to a pressure element 18a which moves cam follower CF1 relative to cam CA1 to vary the gating period.

As illustrated in FIGURE 2, this gating switch is connected with the output of constant frequency oscillator 26 to provide the desired electrical pulses to the circuit of counter C1. However, the apparatus illustrated in FIGURE 3 comprises a constant speed synchronous motor 31 which drives a variable speed reducer 32 and, through a magnetic clutch 33, a pulsing cam 34. Cam 34 in turn actuates a switch 35 which supplies pulses to counter C1. It will be seen that, as switch CS1 is closed, magnetic clutch 33 is actuated to connect synchronous motor 31 to cam 34 thus providing pulses to the counter circuit for as long as switch CS1 is closed.

In the system just described, each time meter tank 12 is filled, the oil overflows weir 17 to actuate level control 16 which, in addition to actuating the automatic custody transfer system to discontinue transfer of oil to meter tank 12 and, following actuation and operation of a data programmer, initiating transfer from meter tank 12 to a pipeline through a pump as shown, also actuates the temperature corrected volume readout system to initiate a cycle which comprises two steps, a temperature correction readout and a nominal readout. The value of each readout is added to a previous reading of the counter apparatus so that this apparatus always indicates the total number of units of oil, corrected to a reference temperature, which has been sold since the counter was reset to 0.

In a specific application, meter tank 12 contains 94.722 barrels of crude oil at 60° F. At 125° F. the volume corrected to 60° F. is 91.700 barrels of crude oil while at 25° F. the corrected volume is 96.350. The oil temperature always is between 25 and 125° F. in this particular application and therefore the temperature correction volume is a part of the difference between 91.700 and 96.350 barrels. The temperature correction thus varies between 0 at 125° F. and 4.650 barrels at 25° F. The volume 91.700 is recorded automatically each time the meter tank passes through a fill and transfer cycle. Also, for each tank fill, the temperature corrected volume readout equipment records a correction volume between 0 and 4.650 barrels, depending upon the temperature of the oil in meter tank, and this figure is added to the nominal value of 91.70 barrels which is recorded each time. The cycle repeats for each new fill of meter tank 12 and the only variation in the individual readings is in the amount of temperature correction volume. Calibration figures are shown in Table I. Although Table I includes values for each five degrees of temperature variation, it will be understood that the temperature correction unit described provides a continuous variation throughout the range.

*Table I*

| ° F. | Temperature correction volume, in bbls. | Temperature corrected volume @ 60° F. in bbls. |
| --- | --- | --- |
| 125.0 | 0 | 91.700 |
| 120.0 | .232 | 91.932 |
| 115.0 | .465 | 92.165 |
| 110.0 | .697 | 92.397 |
| 105.0 | .930 | 92.630 |
| 100.0 | 1.162 | 92.862 |
| 95.0 | 1.395 | 93.095 |
| 90.0 | 1.627 | 93.327 |
| 85 | 1.860 | 93.560 |
| 80 | 2.092 | 93.792 |
| 75 | 2.325 | 94.025 |
| 70 | 2.557 | 94.257 |
| 65 | 2.790 | 94.490 |
| 60 | 3.022 | 94.722 |
| 55 | 3.255 | 94.955 |
| 50 | 3.487 | 95.187 |
| 45 | 3.720 | 95.420 |
| 40 | 3.952 | 95.652 |
| 35 | 4.185 | 95.885 |
| 30 | 4.417 | 96.117 |
| 25 | 4.650 | 96.350 |
| 20 | 4.882 | 96.582 |
| 15 | 5.115 | 96.815 |

As noted above, level detector 16 actuates the temperature corrected volume readout cycle when oil overflows from weir 17 to pass through conduit 15 back to surge 10. The details of operation of the lease automatic custody transfer system as a whole are not included here but are described in U.S. Patent 2,940,593, Remke et al. (1960), and in copending application Serial No. 61,691, filed October 10, 1960. The circuit of FIGURE 2 is actuated by the closing of the contacts of level detector 16 which energizes the coil of relay RY1 thus closing contacts RY1-A and opening RY1-B. The closing of contacts RY1-A energizes the latching coil of LR5 which closes contacts LR5-A thus preparing the circuit to cam drive motor CDM2. However, since contacts RY1-B are open this motor is not yet energized. Relay R1 is energized closing contacts R1-A and energizing cam drive motor CDM1. This motor makes a five-minute revolution. During this period switch CDM1-A keeps the circuit to the coils of relays RY1 and R1 closed even though contacts 16 open, and in addition, CDM1 turns the cam CA1 of switch CDM1-B. During the time that CDM1 is running the position of cam follower CF1 is determined by the temperature within meter tank 12. For example, if the temperature is 75° F., cam follower CF1 drops off spiral cam CA1 when the revolution is 50 percent completed. Gating switch CS1 closes and pulses from oscillator 26 or switch 35 register on the .001 decade counter. In this example, 2,325 pulses pass to this counter before cam CA1 completes its revolution and reopens the gating switch. The temperature correction volume of 2.325 barrels has been added to the counter reading.

After CDM1 has completed its revolution, contact 16 being open at this time, RY1 and R1 de-energize. At this time cam drive motor CDM2 is energized through the latched contacts LR5-A of relay LR5 and the normally closed contacts RY1-B of relay RY1. CDM2-A closes to seal in CDM2 for one revolution. CDM2-C closes thus energizing cam drive motor CDM3. CDM2-B closes thus unlatching LR5 and CDM2–A opens thus deenergizing CDM2. CDM1 and CDM2 cannot restart until meter tank 12 is again filled.

When CDM3 is energized CDM3–A closes which seals CDM3 in for one revolution. During the revolution of CDM3 the various cam actuated switches indicated at CDM3–B, CDM3–C, CDM3–D and CDM3–E are driven to pulse the decade counters 10, 1, 0.1, and .01, respectively. The cams of these switches are notched to provide the desired pulses to each of the respective counters but in such a manner that no two of the counters are energized simultaneously. In this example, CDM3–B is notched for nine pulses, CDM3–C for one pulse, CDM3–D for seven pulses, and CDM3–E for 0 pulse, thus feeding in a volume of 91.700 barrels.

The above cycle repeats each time meter tank 12 is filled, the only variation being the amount of the temperature correction volume which is a function of the temperature of the oil in meter tank 12. Relay RY2 is energized each time the system is energized. However, the coil of this relay becomes energized following the delay of time delay relay TD1 since it is connected through the contact TD1–1. If the power supply fails for any reason, TD1 is de-energized, RY2 is de-energized, and contact RY2–A opens the oscillator output circuit. When the power supply is resumed, the power to the oscillator is supplied immediately and the oscillator electronics begin to warm up. After the delay of TD1, RY2 is energized. Thus, if a readout cycle was in progress, no inaccuracy results from a power failure.

Provision is made for testing the oscillator stability and accuracy through use of cam driver motor 4, switch SW2, pushbutton 28, and test counter 27. With SW2 in test position, pushbutton 28 is depressed for a few seconds to energize CDM4. This motor seals in through CDM4–B and continues to run when pushbutton 28 is released. CDM4–A closes and oscillator pulses are registered on the test counter. When the oscillator frequency is properly tested to match the calibration of a particular meter tank, the test reading is recorded. Subsequent tests should give the same reading if the oscillator frequency does not drift.

Relay RY4, through its contacts RY4–A and RY4–B, prevents false counts due to a power failure during the nominal volume readout cycle. If power fails, RY4 is de-energized thus opening RY4–A and RY4 can be re-energized only through the circuit which includes all of the switches of the nominal volume readout group. Thus, if one of these switches is in pulsing position, RY4 does not energize until CDM3 has continued to turn for a long enough period to return the particular switch to the position illustrated in the drawing, thus re-energizing RY4. The CDM3 switches thus cannot transmit one pulse before a power failure and another pulse after the power failure for a single notch. The CDM3 switches can supply a power pulse to each respective counter only through the circuit which includes RY4–A, thus preventing the occurrence of pulses on more than one decade counter at a given time.

Clock motor 21a is provided when it is desired to record a continuous reading of the temperature of meter tank 12 and in such an instance this motor is provided with power from conductor H as indicated.

Figure 4:
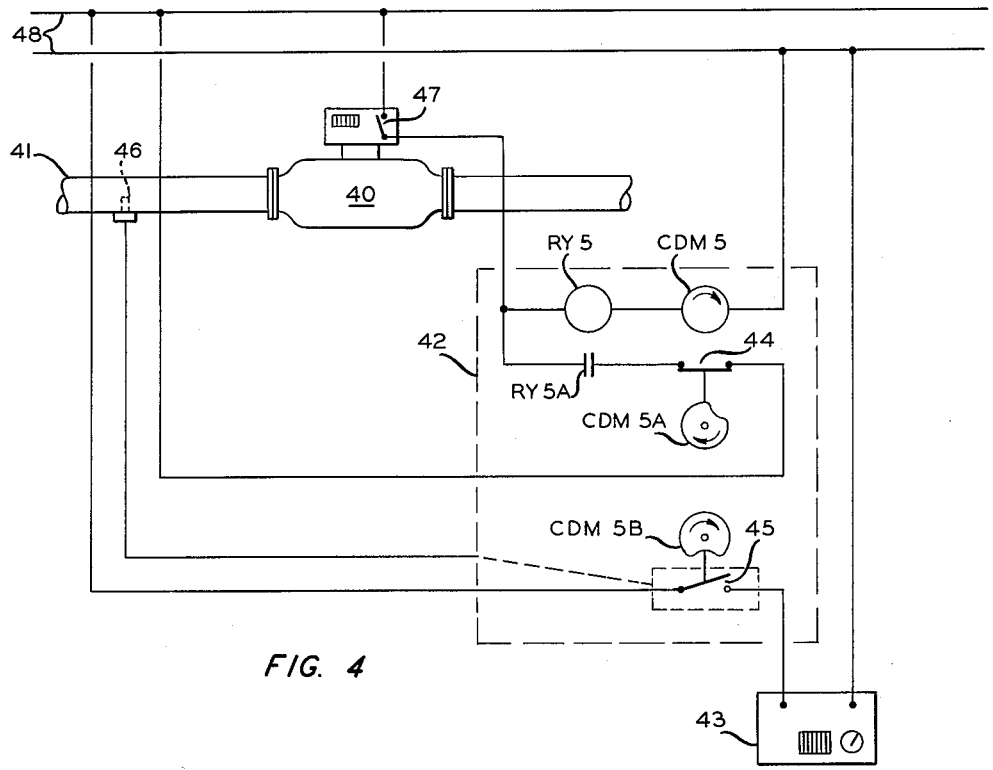
FIGURE 4 is a schematic diagram including electrical circuit details of a system for recording a nominal flow and a temperature correction volume.

The apparatus illustrated in FIGURE 4 comprises a rotary positive displacement meter 40 connected in a flow line 41, a temperature actuated gating means 42 and a pulse recorder 43. Gating means 42 comprises relay RY5 and associated contacts RY5–A, cam drive motor CDM5 and driven cams CDM5–A and CDM5–B, stationary switch contacts 44 and movable contacts 45 actuated by a temperature sensing means 46. The actuation of the contacts 45 with relation to CDM5–B is similar to the actuation of gating switch 30 in FIGURE 3, that is, contacts 45 are moved relative to CDM5–B by temperature sensing means 46 so that the time of closure of contact 45 for each revolution of CDM5 is a function of the temperature of the flowing liquid. A switch 47 is a part of the volume counting register of meter 40.

The volume counting mechanism of meter 40 is such that switch 47 is closed upon each multiple of a fixed increment of flow, for example, 10 barrels. When switch 47 closes, a circuit is completed across alternating current power source 48 through the coil of relay RY5 and through cam drive motor CDM5. This starts the rotation of CDM5, closing contacts 44. When relay RY5 is energized, its contacts RY5–A are closed thus completing a circuit parallel with the circuit through switch 47 so that, when switch 47 opens, the rotation of CDM5 continues for one revolution until CDM5–A opens contacts 44. During this revolution, CDM5–B closes contacts 45 for a period which is determined by the configuration of CDM5–B and the positioning of contacts 45 by temperature element 46. During the time contacts 45 are closed, a circuit is completed across alternating current source 48 through pulse counter 43. This pulse counter records the number of cycles of the alternating current during this period. Since the alternating current source supply serves as a source of electrical pulses, a separate pulse generator is not required. Another advantage of this system is that variations in the frequency of the alternating current supply are automatically compensated. This occurs because CDM5 is a synchronous motor and thus its speed of rotation varies exactly as the variation in the rate of pulses to counter 43 and the frequency variation is automatically compensated.

My invention has been disclosed for use in combination with lease automatic custody transfer systems and the invention has particular utility in such combinations. The temperature corrected volume readout systems can be used equally well with single lease systems and with multi-lease systems using a single metering tank. The readout system illustrated in FIGURE 4 also can be used with a dump tank system, while the systems of FIGURES 2 and 3, on the other hand, also can be used with a rotary or other type positive displacement meter. Thus, my invention can be used in any liquid metering system utilizing the dump tank principle as well as other types of positive displacement volume metering means such as various types of positive displacement meters.

With the system described above, the temperature correction is a positive value. However, it can be applied either by adding or subtracting depending upon the relationship of the reference temperature and the range of temperature through which the transferred liquid varies. In either instance, the reference temperature must not fall within the variation of temperature actually encountered since this would require a partial subtraction and a partial addition. When the desired reference temperature falls within the normally encountered range of temperatures, a nominal volume is recorded for each increment of actual volume measured and the correction made from the nominal volume. This is the same system as utilized in the dump tank system described with respect to FIGURE 1 and FIGURE 2. In this manner, the volume correction is always applied in one direction and the necessity for both addition and subtraction is eliminated. Recording of the nominal volume can be done with a system similar to that illustrated in FIGURE 2, the meter head switch actuating the system in the same manner as float switch 16 or can be accomplished by adjusting the meter itself to read the nominal rather than the actual volume.

Figure 5:
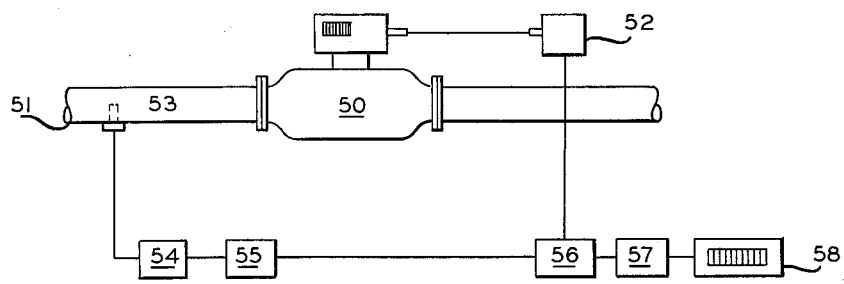
FIGURE 5 is a schematic diagram of a system utilizing and combining electrical signals representing flow and temperature to record a temperature corrected volume.

In the system illustrated in FIGURE 5, a rotary positive displacement meter 50 is connected in a delivery line 51 and the volume readout apparatus includes a tachometer type generator 52, connected to the rotary mechanism of the volume counting register of meter 50, a temperature sensing resistor 53, a temperature voltage transducer 54, a pair of computer components 55 and 56, a current/pulse rate transducer 57 and an impulse counter 58. In one embodiment, generator 52 rotates continuously at a rate determined by the rate of flow through line 51 and generates an electrical signal proportional thereto and this signal is transmitted to computer component 56. This signal can represent the actual volume flow rate or can represent a nominal flow rate. By nominal flow rate is meant the actual flow rate reduced by an amount equivalent to that volume necessary to correct a volume at 125° F. to 60° F. This reduction is analogous to the reduction made when a dump tank system is used as described in connection with Table I and is made by a mechanical adjustment of the meter. Transducer 54 continuously transmits to computer component 55 an electrical signal proportional to the temperature of the liquid in line 51. In this component, the temperature signal has subtracted from it constant value representing a nominal temperature and the result is multiplied by a constant representing the volume/temperature coefficient of the liquid being transferred. Thus, the output of component 55 is a function of $K(t_2-t_1)$ in which K is a constant representing the product of the nominal volume $V_n$ and the volume temperature coefficient, $t_2$ is the temperature of the liquid in the line, and $t_1$ is the nominal temperature. For example, when the nominal volume is the volume measured by the meter corrected from 125° F. to 60° F., $t_1$ is 125° F. In component 56 the signal transmitted from component 55 is added to the signal transmitted by generator 52 and the output of component 56 is a function of $V_n-K(t_2-t_1)$ and thus represents a temperature corrected volume. This signal is converted to a corresponding pulse rate in transducer 57 and this rate of pulses, representing a corrected rate of flow, is transmitted to impulse counter 58. Since impulse counter 58 is continuously fed a rate of flow, that is, an instantaneous volume measurement, this instrument serves to integrate the signal with respect to time and the resulting number represents the volume transferred during the period of operation.

The above-described determination is accurate enough for most practical applications since the volume temperature coefficient varies only a small amount in the normal temperature range encountered. In fact, for most applications, it is accurate enough (and much more accurate than mechanical temperature corrections made by the positive displacement meter) to use a correction factor which is an average value of $$\frac{1+K(t_2-t_1)}{t_2}$$

When this is done, a simple multiplication is all that need be done in the computer component and a single multiplying component (not shown) can be substituted for components 55 and 56.

Computer components 55 and 56 can be those made by Electronics Associates, Long Branch, New Jersey, and described in their Bulletins AC934 and AC6020-1, those made by Computer, Inc., Houston, Texas, and described in AIEE Paper 54-389, and those made by George A. Philbrick Researches, Inc., Boston, Massachusetts, and described in their bulletin "Applications Manual for Philbrick Octal Plug-In Computing Amplifiers," copyright 1956. Counter 43 can be a Sigma Cyclonome pulse counter, manufactured by Sigma Instruments, Inc., 170 Pearl Street, South Braintree 85, Massachusetts.

Reasonable variation and modification are possible within the scope of this disclosure, the drawing and the appended claims to the invention the essence of which is a method and apparatus for recording a temperature corrected volume by automatically recording a nominal volume and automatically gating a source of electrical pulses responsive to the temperature of the liquid to record a temperature correction volume, and a novel temperature responsive gating switch.

I claim:

1. A method for metering liquid which comprises transferring a fixed volume of said liquid, recording a nominal value representative of said fixed volume corrected to a reference temperature from a fixed temperature, measuring a temperature representative of the temperature of said volume, automatically producing and recording, responsive to said temperature, a number of electrical pulses representative of the difference between said nominal value and the amount of said volume corrected to said reference temperature.

2. A method for metering a volume of liquid which comprises accumulating a fixed volume of said liquid, transferring said fixed volume, at each transfer of said liquid, automatically recording a nominal value representative of said fixed volume corrected to a reference temperature from a fixed temperature, automatically measuring a temperature representative of the temperature of said fixed volume of liquid, automatically gating a source of electrical pulses responsive to said temperature to record a volume representative of the difference between said nominal value and the amount of said fixed volume temperature corrected to said reference temperature.

3. A method for metering liquid which comprises transferring said liquid through a positive displacement meter, recording a nominal value representative of the volume of said liquid transferred corrected to a reference temperature from a fixed temperature, measuring a temperature representative of the temperature of said volume, automatically producing and recording, responsive to said temperature, a number of electrical pulses representative of the difference between said nominal value and the amount of said volume corrected to said reference temperature.

4. A method for metering liquid which comprises transferring a fixed volume of said liquid, producing and transmitting electrical pulses of a first value representative of a nominal value representative of said fixed volume corrected to a reference temperature from a fixed temperature, measuring a temperature representative of the temperature of said volume, automatically gating a source of electrical pulses responsive to said temperature to transmit a second value representative of a temperature correction volume, automatically combining said first and second values to record a third value representative of the amount of said fixed volume temperature corrected to said reference temperature.

5. A method for metering a volume of liquid which comprises accumulating a fixed volume of liquid, transferring said fixed volume, at each transfer of said liquid automatically producing and transmitting electrical pulses to record a nominal value representative of said fixed volume corrected to a reference temperature from a fixed temperature, automatically measuring a temperature representative of the temperature of said fixed volume of liquid, automatically gating a source of electrical pulses responsive to said temperature to record a second value representative of a temperature correction volume, automatically combining said first and second recorded values to produce a third recorded value representative of the amount of said fixed volume temperature corrected to said reference temperature.

6. A method for metering liquid which comprises transferring a volume of said liquid through a positive displacement meter, producing and transmitting electrical pulses of a value representative of said volume corrected to a reference temperature from a fixed temperature, measuring a temperature representative of the temperature of said volume, automatically gating a source of electrical pulses responsive to said temperature to transmit a second value representative of a temperature correction volume, automatically combining said first and second values to record a third value representative of the amount of said fixed volume temperature corrected to said reference temperature.

7. Apparatus for metering liquid comprising positive displacement volume metering means, means for transferring a fixed volume of said liquid therethrough, means to record a value representative of a nominal value representative of said fixed volume corrected to a reference temperature from a fixed temperature, means for measuring the temperature of said liquid transferred, automatic means for producing and recording, responsive to said temperature, a number of electrical pulses representative of the difference between said nominal value and the amount of said volume corrected to said reference temperature.

8. Apparatus for metering a volume of liquid comprising a meter tank, means for alternately filling said meter tank and transferring the contents thereof, automatic means to record a value representative of the volume of said meter tank corrected to a reference temperature from a fixed temperature for each filling and transfer cycle, automatic means for measuring the temperature of said volume of liquid, automatic gating means operatively connected with said means for measuring temperature to transmit a number of electrical pulses to record a value representative of the difference between said nominal value and the amount of said volume corrected to said reference temperature.

9. Apparatus for metering a volume of liquid comprising a meter tank, means for alternately filling said meter tank and transferring the contents thereof, automatic means to transmit a number of electrical pulses to record, once for each filling and transfer cycle, a first value representative of the volume of said meter tank corrected to a reference temperature from a fixed temperature, automatic means responsive to the temperature of said volume of liquid being metered, automatic gating means operatively connected with said temperature responsive means to transmit a number of electrical pulses to record a second value representative of a temperature correction volume, automatic means to combine said first and second recorded values to produce a third recorded value representative of the volume of said meter tank temperature corrected from said temperature of said volume of liquid to said reference temperature.

10. Apparatus for metering liquid comprising positive displacement volume metering means, means for transferring a fixed volume of said liquid therethrough, means to record a nominal value representative of said fixed volume corrected to a reference temperature from a fixed temperature, automatic means responsive to the temperature of said liquid being metered, pulse gating means, a motor driven cam, a cam follower operatively connected with said temperature responsive means and with said pulse gating means, said follower being actuated by said cam to gate a number of electrical pulses representative of the difference between said nominal value and the amount of said volume corrected to said reference temperature.

11. Apparatus for metering a volume of liquid comprising a meter tank, means for alternately filling said meter tank and transferring the contents thereof, automatic means to transmit, once for each filling and transfer cycle, a first number of electrical pulses representative of the volume of said meter tank corrected to a reference temperature from a fixed temperature, automatic means responsive to the temperature of said volume of liquid being metered, a motor driven cam, a cam follower operatively connected with said temperature responsive means, said follower being positioned with respect to said cam by said temperature responsive means, said cam follower being actuated by said cam to gate the output of an oscillator to transmit, once for each filling and transfer cycle, a second number of electrical pulses representative of a temperature correction volume, pulse actuated counters to record and combine said first and second numbers of pulses to produce a recorded value representative of the volume of said meter tank corrected to said reference temperature from said temperature of said volume of liquid being metered.

12. Apparatus for measuring a volume of liquid comprising a meter tank, means for alternately filling said meter tank and transferring the contents thereof to meter said liquid, a plurality of electrical pulse actuated single decade counters, means interrelating said counters to form a multi-digit chain wherein one complete cycle of each counter actuates an adjacent counter representing the next higher decimal position to add one digit, a plurality of switch mechanisms, each mechanism comprising a rotary cam and a switch actuated thereby, said switch mechanisms being connected with the electrical circuits to selective counters and each of said cams being provided with a number of switch actuating portions whereby, upon revolution of said cam, electrical pulses are fed to said counters to record thereon a first number representative of the volume of said meter tank corrected to a reference temperature from a fixed temperature, automatic means responsive to the temperature of said volume of liquid being metered, a temperature correction cam, a cam follower operatively connected with said temperature responsive means, an electrical pulse generator, said cam follower being actuated by said temperature correction cam to gate the output of said generator to feed, once for each revolution of said temperature correction cam, electrical pulses to said counters to record thereon a second number representative of a temperature correction volume, said counters combining said first and second numbers to produce a recorded value representative of the volume of said meter tank corrected to said reference temperature from said temperature of said volume of liquid being metered, automatic means actuated by said means for alternately filling said meter tank and transferring the contents thereof to energize driving means for said rotary cams to rotate said cams one revolution and to energize said temperature correction cam to cause said temperature correction volume to be recorded, once for each filling and transfer cycle.

13. A temperature corrected cam actuated temperature correction readout system comprising a rotary cam, means to rotate said cam, constant frequency electrical pulse generating means, pulse recording means, a gating switch for the output of said generating means, a cam follower operatively connected with said switch, temperature responsive means for positioning said follower in relation to said cam whereby, for each revolution of said cam, said gating switch is actuated to connect the output of said generating means to said recording means for a period of time proportional to the value of said temperature.

14. Apparatus for measuring liquid, comprising positive displacement volume metering means, means for transferring said liquid through said metering means, a pulse recorder, a source of alternating electrical current, a temperature correction cam, automatic means responsive to the temperature of said liquid being measured, a cam follower operatively connected with said temperature responsive means, said follower being positioned with respect to said cam by said temperature responsive means, said cam follower being actuated by said cam to gate the output of said source of alternating current to transmit to said pulse recorder once for each actuation of said cam a number of cycles of current representative of a volume, means to record the volume measured by said cam means responsive to a predetermined volume of flow to said volume metering means to actuate said cam.

References Cited in the file of this patent
UNITED STATES PATENTS

| | | |
|---|---|---|
| 2,817,967 | Meyers | Dec. 31, 1957 |
| 3,012,436 | Meyers | Dec. 12, 1961 |